UNITED STATES PATENT OFFICE.

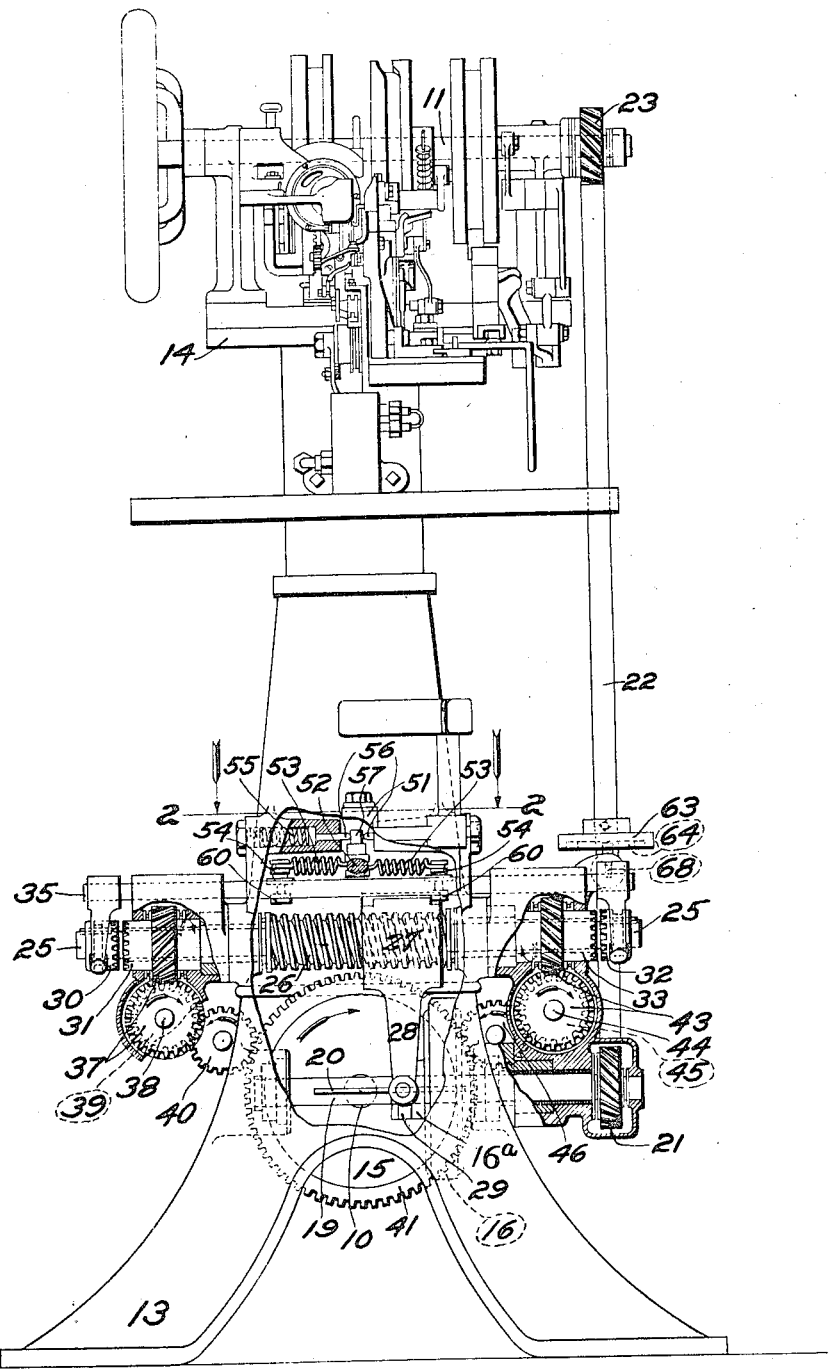

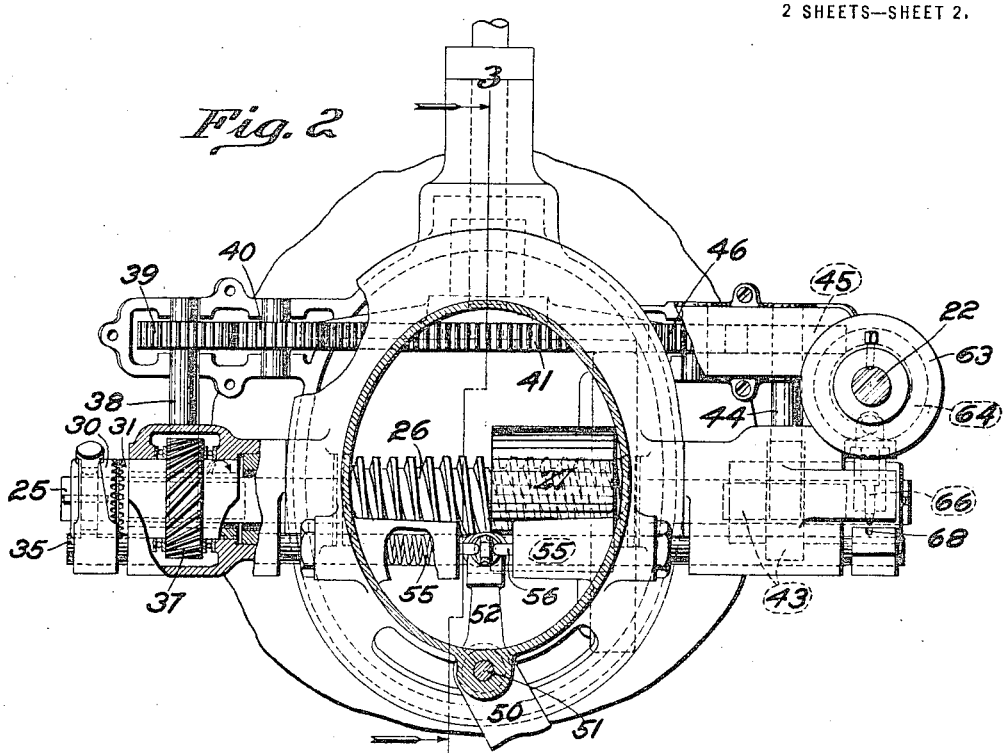
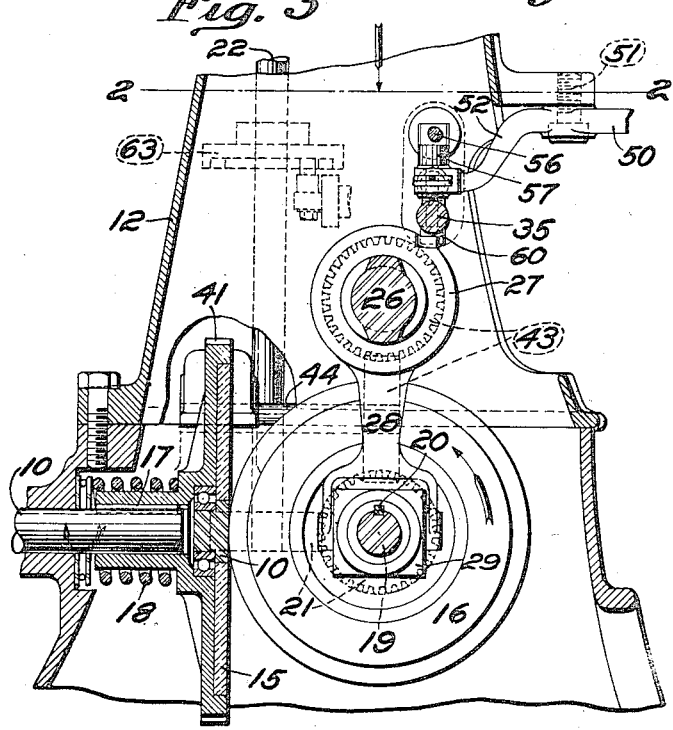
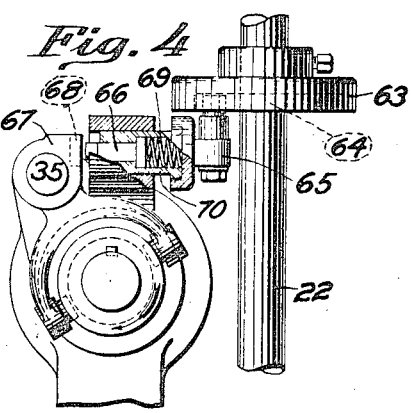

AUGUST R. SCHOENKY, OF SOMERVILLE, MASSACHUSETTS.

SPEED-CHANGING MECHANISM FOR POWER-DRIVEN MACHINES.

1,175,893.　　　　　Specification of Letters Patent.　　Patented Mar. 14, 1916.

Application filed March 9, 1914. Serial No. 823,330.

*To all whom it may concern:*

Be it known that I, AUGUST R. SCHOENKY, a citizen of the United States, residing at Somerville, in the county of Middlesex and State of Massachusetts, have invented certain new and useful Improvements in Speed-Changing Mechanism for Power-Driven Machines, of which the following is a specification, reference being had therein to the accompanying drawing.

This invention relates to speed changing mechanism for power driven machines, and particularly to a mechanical combination of elements whereby the relative speed of the driver or power shaft and the driven member, such as the running shaft, may be readjusted under proper control for starting or stopping or increasing or decreasing the motion of the driven shaft.

The invention is adaptable to many classes of power driven machines, for example stationary machines such as are used in factories for turning out a product. For purposes of illustration an outsole stitching machine is chosen for embodying the present invention.

The main object of the present invention is that the motion of the power shaft, which may be supposed to be running continuously and steadily, may be effectively transmitted to the driven shaft with readjustment of transmission consummated automatically under appropriate control.

Other and more specific objects will appear in the hereinafter following description.

To the attainment of such recited objects this invention comprises the novel features of combination, arrangement, mechanism, devices and details herein illustrated and described.

In the accompanying drawings forming a part hereof, Figure 1 is a front elevation of an outsole stitching machine embodying the present invention, the figure partly broken away to show the interior; Fig. 2 is a plan view partly in cross section on the plane 2—2 of Figs. 1 and 3; Fig. 3 is a left elevation, partly in section on the plane 3—3 of Fig. 2; Fig. 4 is a partial detail right hand elevation of certain parts.

Between the horizontal driving shaft 10 and the horizontal driven shaft, or main shaft 11 of the stitching machine, is a certain adjustable transmitter more fully to be described. This transmitter is distinguished from a mere clutch having only full speed and zero positions, the transmitter having also intermediate adjustments, which preferably enables a gradual and progressive change through all consecutive speed ratios. The variable speed transmitter illustrated is of the type known as "face friction gearing." The automatic adjustment thereof will be fully hereinafter described.

The shafts 10 and 11 are mounted in an appropriate frame 12 supported by a base or feet 13 and having at the top a head 14 carrying the various instruments of the stitching mechanism including the work support, presser foot, feeding devices and the like, all of which may be of well known form and will not be particularly described because not *per se* constituting a portion of this invention. The main shaft 11 carries a plurality of cams for operating the different portions of the stitching mechanism.

The face friction gearing herein shown comprises a friction disk 15 mounted at the front end of the driving shaft 10 and a friction wheel 16 which is shiftable across the face of the disk to effect variations in speed ratio. The friction disk is not rigidly secured to the driving shaft but is slidingly mounted at the forward end of the latter, being compelled to rotate with the shaft by a key 17. In order to press the disk forwardly against the wheel a strong coil spring 18 is interposed between the disk and a portion of the machine frame. The friction disk will preferably be faced with a special friction composition and the wheel 16 with a friction fiber ring. The friction wheel 16 is slidingly mounted on a cross shaft 19 having suitable fixed bearings and a key 20 between wheel and shaft permits its sliding while compelling the two to rotate together, so that as the wheel is adjusted across the friction disk the shaft is compelled to rotate at varying speeds. At the external extremity of the cross shaft 19 is shown a pair of engaging spiral gears 21 whereby the horizontal motion is communicated to the upwardly extending rotary shaft or rod 22, which at its upper end is geared to the main shaft of the machine by a pair of spiral gears 23. By the described connections the motion of the driving shaft 10 is communicated to the main shaft 11.

To effect the automatic adjustment of the transmitter is shown a horizontal adjusting shaft 25 which extends completely through the machine, and at its center is provided with a screw-threaded portion 26 engaged by an interiorly threaded sleeve or block 27 carrying a projecting arm 28 having a fork at its lower extremity within which is pivoted a square block 29, centrally apertured and engaged in the groove in a collar 16a secured to the friction wheel 16. Obviously with this arrangement the revolution of the adjusting shaft 25 effects the shifting of the block 27 and of the wheel 16. While the adjusting shaft 25 might be turned by hand, for example by a crank for some purposes, there is shown means for automatically revolving it to effect the speed changes. Thus the mechanism about to be described is capable of rotating the shaft to adjust the friction wheel 16, either to the center of the friction disk so as to cause a cessation of driving and stop the machine, or on the other hand to the margin of the disk so as to drive the stitching mechanism at the normal or full speed.

In order to give the adjusting shaft 25 either a right or a left hand rotation at will a pair of clutch members 30, 31, are shown at its left hand end, and a similar pair of clutch members 32, 33, at its right hand end. The two clutch members 30 and 32 are axially movable at will, and for this purpose they are both connected to or suspended from a clutch control rod 35 adapted to slide to the right or to the left under the control of the operator. Sliding the rod 35 to the right engages the clutch members 30, 31, and sliding it to the left engages the clutch members 32, 33. These two adjustments of the clutch controlling rod serve to effect the right or left hand rotation of the adjusting shaft 25 by the following means: The clutch member 31 is in the form of a sleeve loosely surrounding the shaft 25 and adapted to be continuously rotated through a pair of spiral gears 37, a short countershaft 38, a toothed gear 39 on the shaft and a pinion 40 between the gear 39 and a large gear 41 constituted at the periphery of the friction disk 15. By these connections the continuous rotation of the driving shaft 10 serves to continuously rotate the parts 31—41 in the directions of the respective arrows. Similarly at the other side of the machine the clutch member 33 is continuously driven by spiral gears 43, shaft 44, gear 45, pinion 46 and gear 41. These connections cause the clutch member 33 to rotate in a direction opposite to the clutch member 31. If now the clutch-control rod 35 is shifted to the right the continuously rotating parts 31—41 acting through the clutch members 30—31 effect the rotation of the adjusting shaft 25 in the same direction as clutch member 31 that is clockwise when viewed from the left, whereas throwing the clutch-controlled rod completely to the left engages the clutch members 32 and 33 thus rotating the shaft in the opposite direction. If the rod be held in central position, as shown in Fig. 1, both clutches are disengaged and, therefore, no adjustment of the friction wheel 16 is caused, the wheel in such case maintaining its position and being adequately locked in position by the screw engagement of the adjusting shaft with the threaded block 27.

The adjustment of the control rod 35 is to be regulated at will by a suitable part or lever, such as the knee lever 50, pivoted at 51 to a fixed part of the frame, and having an inwardly projecting arm 52 shown in cross section in central position in Fig. 1. By throwing the external portion of the lever 50 the inward extension moves to right or left, and such movement effects the shifting of the control rod 35 by suitable connections. For example, resilient connections are shown to prevent any shock to the knee of the operator. These comprise a pair of fairly stout springs 53, 53, each connected to the lever extension 52 at the center, and each at its outer extremity connected, under tension, with upwardly projecting studs 54 secured directly in the control rod 35. By this arrangement on throwing the knee lever to one side one of the springs 53 is put under tension tending to pull the control rod to one side thereby causing the engagement of one of the clutches and thereby causing the adjustment of the speed transmitter toward or from zero position.

It is desired that the control rod shall normally take its illustrated central position, and for this purpose a pair of positioning springs 55 are shown mounted in fixed barrels each operating to push upon a short pin 56, the two oppositely pressing upon an upward projection 57 at the inner end of the knee lever extension. By this arrangement when the operator releases the knee lever the springs 55, 55, coöperate to centralize the lever in the position shown in Fig. 1, the springs being previously adjusted to balance for this purpose.

The operation of the machine as thus far described may be as follows:—The clutch 32, 33 may be considered a starting clutch for when engaged it serves to adjust the friction wheel 16 from the center or zero position to the periphery of the friction disk, whereas the clutch 30, 31, acting contrarily may be termed the stopping clutch. Assuming the machine to be running at full speed the operator to stop it throws his knee to the left, which, as seen in Fig. 2, will cause the knee lever interior extension 52 to swing to the right and this, through the springs 53, effects adjustment of the clutch control rod 35 to the right thus throwing the stopping clutch into engagement and causing the stoppage of the machine. A reverse movement of the knee lever will cause the restarting of the machine. A central position of the knee lever effects no change of speed or condition.

It would be difficult for the operator after throwing in one of the clutches to determine at what point to throw it out of engagement, and to avoid any attention to that there is shown means for automatically opening or disengaging the clutches, or either of them, when the transmitter has attained either of its extreme positions. This mechanism operates on the principle of employing the shifting of the friction wheel to effect at the proper moment the disengagement of whichever clutch may be engaged. A convenient mode of doing this is simply to provide for each of the clutches a depending portion 60 upon the clutch control rod 35, these depending portions coöperating with the upper portion of the threaded block 27 by which the shifting of the friction wheel is effected, so that the block may strike the depending piece and thereby shift the control rod to disengage the clutch. For example, suppose the starting clutch 32, 33, has been engaged by a leftward movement of the control rod 35, the operation of the clutch causes the rotation of the adjusting shaft 25 to shift the threaded sleeve 27 and the friction wheel to the right. When completely to the right and in the position, as shown in Fig. 1, the upper corner of the block 27 strikes the right hand depending piece 60 thereby forcing the control rod 35 to the right and disengaging the starting clutch. This action leaves the control rod in central position and leaves the machine in full running condition. In this adjustment the machine is in full running condition. When the knee lever is thrown to the left for stopping the machine the control rod 35 is thrown to the right which causes the stopping clutch 30, 31 to engage so that the shaft 25 is rotated in such direction as to move the block 27 leftward. When it is moved so far to the left that the friction wheel 16 is at the center of the driving disk 15, the upper left hand corner of the block strikes the left hand depending lug 60 and thereby displaces the control rod 35 to the left so as to restore it to its central position shown in Fig. 1, wherein both clutches are disengaged.

It is desirable with machines having reciprocating parts, such as needles and awls, that the main shaft shall be brought to rest in a predetermined position, so that, for example, the needles and awls may come to rest disengaged from the work thereby facilitating the removal of the work. A novel expedient for securing this result is embodied in the machine hereof in the following form: Mounted on the upright rotating rod 22 is a cam disk 63 having a groove 64 in its under surface for effecting the operations about to be described. It will be noted that the upright rod 22 has a positively geared connection with the main shaft so that the position of the cam 63 always corresponds with the position of the main shaft. The purpose of the cam 63 is to effect an intermittent locking of the clutch control rod 35 in neutral or central position when the machine is in operation. The details of this part of the invention are shown in Fig. 4. The cam groove 64 is engaged by a follower 65 capable of horizontal reciprocation, the follower serving to actuate a locking pin 66, which is located opposite to a collar 67 fast at the right end of the control rod 35, the collar having a recess 68 adapted to admit the locking pin 66 at certain times. The contour of the cam groove 64 is seen in Fig. 2, it being mainly concentric but with a short eccentric portion which once during each rotation effects the withdrawal of the locking pin 66 from the recess 68. Obviously when the pin and recess are engaged the operator is unable to shift the rod 35, therefore, the only time at which he can effect the shifting of the rod is that brief period during each rotation when the cam 64 has withdrawn the locking pin. The moment the control rod is shifted to the right the screw 26 takes effect to shift the friction wheel 16 toward zero position, and the time occupied in such shifting is definitely known. The cam 63 is so adjusted on the upright rod 22 that the control rod 35 may only be shifted at the proper time to bring the friction wheel to stopping position with the needle and awl disengaged from the work. To prevent breakage at such times as when the recess 68 is not opposite the pin 66 the pin is provided with a resilient connection to the stud 65, this comprising a compressed spring 69 within the sliding barrel 70. The parts are so arranged and timed that after the machine has been brought to rest the locking pin 66 is held by the cam 64 out of engagement with the recess 68 so that at such times the operator is free to shift the control rod by means of the knee lever and thereby effect the restarting of the machine.

The devices just described, including the locking pin 66 and the parts coöperating therewith, may be considered and referred to as a guard, since this device guards against the operator causing the stopping adjustment at the wrong point of time. The guard device determines exactly the time of effecting the stopping adjustment and thereby insures a definite final shaft position. It is important that this guard, which is a reciprocating device, be actuated in time with the driven shaft itself. In this way the driven shaft controls the guard and thereby indirectly controls its own stopping so as to secure the desired predetermined shaft position.

It will thus be seen that there has been described an illustration embodying the operation and principles of the present improvement and attaining the objects and advantages hereof, and other advantages will be apparent to those skilled in the art. Since many matters of arrangement, detail, combination and other features may be indefinitely varied, it is not intended to limit the present invention to such features excepting so far as specified in the appended claims.

What is claimed is:

1. In a power driven machine the combination of a driving shaft, a driven shaft, an adjustable transmitter between the two, a transmitter adjusting shaft, connections operative with said adjusting shaft for adjusting said transmitter, a clutch member constantly driven from said driving shaft, a clutch member for operating said adjusting shaft, and means for engaging or disengaging said clutch members at suitable times.

2. In a power driven machine the combination of a driving shaft, a driven shaft, an adjustable transmitter between the two, a transmitter adjusting shaft, connections operative with said adjusting shaft for adjusting said transmitter, said adjusting shaft being operable in either direction for adjusting the transmitter either way, a clutch member constantly driven from said driving shaft, a clutch member operatively connected to said adjusting shaft, said two clutch members constituting a pair engageable and disengageable for actuating in one direction said adjusting shaft, a second such pair of clutch members giving a reverse actuation of the adjusting shaft, and means for engaging or disengaging said clutch members at suitable times.

3. In a power driven machine the combination of a driving shaft, a driven shaft, an adjustable transmitter between the two, a transmitter adjusting shaft, connections operative with said adjusting shaft for adjusting said transmitter, two shaft-actuating clutch members on said adjusting shaft, a constantly rotating clutch member coöperating with each thereof, a clutch shifting rod having one pair of said clutch members connected to it, and means to shift said rod in either direction at suitable times to throw either clutch into action.

4. In a power driven machine the combination of a train of constantly running parts including a driving shaft, a driven shaft, a variable speed transmitter, a shiftable adjusting part, adapted to adjust said transmitter, connections from a running part of the machine for shifting said part, and means whereby the shifting of said part automatically disconnects said connections when said part attains a maximum speed adjustment on the one hand or on the other hand a minimum speed or zero adjustment.

5. In a power driven machine the combination of a driving shaft, a driven shaft, a variable speed transmitter, a shiftable adjusting part adapted to adjust said transmitter, a starting clutch having a constantly running member, and connections from said starting clutch adapted when the clutch is closed to effect the shifting of said adjusting part from zero, a stopping clutch for effecting the shifting of said part to zero, a clutch control rod shiftable at suitable times for closing either clutch or opening both, and means whereby the said adjusting part shifts said rod as soon as maximum or zero adjustment is attained to open both said clutches.

6. In a power driven machine the combination of a driving shaft, a driven shaft, a variable speed transmitter, a shiftable adjusting part adapted to adjust said transmitter, a starting clutch having a constantly running member, and connections from said starting clutch adapted when the clutch is closed to effect the shifting of said adjusting part from zero, a stopping clutch for effecting the shifting of said part to zero, a clutch control rod shiftable at suitable times for closing either clutch or opening both, and means whereby the said adjusting part shifts said rod as soon as maximum or zero adjustment is attained to open both said clutches, an operating member for shifting said rod at will, resilient connections between operating member and rod, and resilient centering means tending to hold said rod in position to open both clutches.

7. In a power driven machine such as a sewing machine, a main shaft from which a reciprocating part is operated, a driving shaft, a variable speed transmitter between driving and main shafts, a constantly running clutch member, a clutch member adapted to engage and disengage said first clutch member, connections from said second clutch member such that when the clutch members are engaged said transmitter is adjusted progressively from full speed to zero adjustment, and a controller for at suitable times causing engagement of said clutch members.

8. In a power driven machine such as a sewing machine, a main shaft from which a reciprocating part is operated, a driving shaft, a variable speed transmitter between driving and main shafts, a constantly running clutch member, a clutch member adapted to engage and disengage said first clutch member, connections from said second clutch member such that when the clutch members are engaged said transmitter is adjusted progressively from full speed to zero adjustment, a controller for at suitable times causing engagement of said clutch members, and means locking said controller against operation except at a predetermined angular position of the main shaft.

9. In a power driven machine such as a sewing machine, a main shaft from which a reciprocating part is operated, a driving shaft, a variable speed transmitter between driving and main shafts, a constantly running clutch member, a clutch member adapted to engage and disengage said first clutch member, connections from said second clutch member such that when the clutch members are engaged said transmitter is adjusted progressively from full speed to zero adjustment, a controller for at suitable times causing engagement of said clutch members, and means locking said controller against operation except at a predetermined angular position of the main shaft, said locking means including a bolt and socket device for preventing the engagement of the clutch members, and a rotary device or cam for intermittently disengaging the bolt from the socket.

10. In a power driven machine the combination of a train of constantly running parts including a driving shaft, a driven shaft, a variable speed transmitter between the shafts adapted to be adjusted progressively between zero and maximum speed adjustments, connections actuated from a constantly running part by the power of the driving shaft for adjusting the transmitter toward zero adjustment, and automatic means operative at such zero adjustment for rendering ineffective said transmitter adjusting connections with the driven shaft stopped.

11. In a power driven machine the combination of a train of constantly running parts including a driving shaft, a driven shaft, a variable speed transmitter between the shafts adapted to be adjusted progressively between zero and maximum speed adjustments, connections actuated from a constantly running part by the power of the driving shaft for adjusting the transmitter from zero adjustment, and automatic means operative at a predetermined running speed for rendering ineffective said transmitter adjusting connections.

12. In a power driven machine the combination of a train of constantly running parts including a driving shaft, a driven shaft, a variable speed transmitter between the shafts adapted to be adjusted progressively between zero and maximum speed adjustments, connections actuated from a constantly running part by the power of the driving shaft for adjusting the transmitter either toward or from zero adjustment, and automatic means operative either at such zero adjustment or at a predetermined running speed for rendering ineffective said transmitter adjusting connections.

13. In a power driven machine the combination of a train of constantly running parts including a driving shaft, a driven shaft, a variable speed transmitter between the shafts adapted to be adjusted progressively between zero and maximum speed adjustments, connections actuated from a constantly running part by the power of the driving shaft for adjusting the transmitter toward zero adjustment, and automatic means operative at such zero adjustment for rendering ineffective said transmitter adjusting connections with the driven shaft stopped; and a controller operable at will for rendering such connections effective.

14. In a power driven machine the combination of a train of constantly running parts including a driving shaft, a driven shaft, a variable speed transmitter between the shafts adapted to be adjusted progressively between zero and maximum speed adjustments, connections actuated from a constantly running part by the power of the driving shaft for adjusting the transmitter either toward or from zero adjustment, and automatic means operative either at such zero adjustment or at a predetermined running speed for rendering ineffective said transmitter adjusting connections; and a controller operable at will for rendering such connections effective.

15. In a power driven machine the combination of a train of constantly running parts including a driving shaft, a driven shaft, a variable speed transmitter between the shafts adapted to be adjusted progressively between zero and maximum speed adjustments, connections actuated from a constantly running part by the power of the driving shaft for adjusting the transmitter toward zero adjustment, and automatic means operative at such zero adjustment for rendering ineffective said transmitter adjusting connections with the driven shaft stopped; and means to insure a definite predetermined final stopping position of the machine.

16. In a power driven machine the combination of a train of constantly running parts including a driving shaft, a driven shaft, a variable speed transmitter between the shafts adapted to be adjusted progressively between zero and maximum speed adjustments, connections actuated from a constantly running part by the power of the driving shaft for adjusting the transmitter either toward or from zero adjustment, and automatic means operative either at such zero adjustment or at a predetermined running speed for rendering ineffective said transmitter adjusting connections; and means to insure a definite predetermined final stopping position of the machine.

17. In a power driven machine the combination of a driving shaft, a driven shaft, a variable speed transmitter between said shafts, a constantly running device actuated from said driving shaft, and connections from said device to said transmitter whereby the device may adjust the transmitter to change the driven shaft speed.

18. In a power driven machine the combination of a driving shaft, a driven shaft, a variable speed transmitter between said shafts, a constantly running device actuated from said driving shaft, and connections from said device to said transmitter whereby the device may adjust the transmitter to restart the machine after stoppage.

19. In a power driven machine the combination of a driving shaft, a driven shaft, a variable speed transmitter between said shafts, a constantly running device actuated from said driving shaft, connections from said device to said transmitter whereby the device may adjust the transmitter to restart the machine after stoppage, and means for controlling the operation of said device.

20. A driving mechanism for power operated machines including in combination, a driver, a driven member, a variable speed transmitter between said driver and driven member, and means whereby said driver may effect the adjustment of the transmitter to restart the driven member after stoppage thereof.

21. A driving mechanism for power operated machines comprising a train of running parts including a driver, a variable speed transmitter and a driven member in combination with connections including a cam and follower between a running part of the mechanism and said transmitter whereby adjustment of the latter may be automatically effected, said connections being normally inoperative, and a controller for rendering said connections operative for adjusting the transmitter to restart the driven member after stoppage thereof.

22. In a power driven machine the combination of a driving shaft, a driven shaft, a variable speed transmitter between said shafts, a constantly rotating device actuated from the driving shaft, connections from said device adapted to adjust the transmitter, and means to automatically cause cessation of such adjustment when the driven shaft comes to a given speed condition.

23. In a power driven machine the combination of a driving shaft, a driven shaft, a variable speed transmitter between said shafts, a constantly rotating device actuated from the driving shaft, connections from said device adapted to adjust the transmitter from zero position to start the rotation of the driven shaft, and means to automatically cause cessation of such adjustment when the driven shaft comes to working speed.

24. In a power driven machine the combination of a driving shaft, a driven shaft, a variable speed transmitter between said shafts, a constantly rotating device actuated from the driving shaft, connections from said device adapted to adjust the transmitter to zero position to effect stoppage of the driven shaft, and means to automatically cause cessation of such adjustment when the driven shaft comes to rest.

25. In a power driven machine the combination of a driving shaft, a driven shaft, a variable speed transmitter between said shafts, constantly rotating devices actuated from the driving shaft, connections from said devices adapted to adjust the transmitter to zero position to effect stoppage of the driven shaft, or from zero position to start the rotation of the driven shaft, and means to automatically cause cessation of such adjustment when the driven shaft comes to rest or to working speed.

26. In a power driven machine the combination of a driving shaft, a driven shaft, a variable speed transmitter between said shafts, a constantly rotating device actuated from the driving shaft, connections from said device adapted to adjust the transmitter to zero position to effect stoppage of the driven shaft, means to automatically cause cessation of such adjustment when the driven shaft comes to rest, and means to insure a definite final driven shaft position.

27. In a power driven machine the combination of a driving shaft, a driven shaft, a variable speed transmitter between said shafts, a constantly rotating device actuated from the driving shaft, connections from said device adapted to adjust the transmitter to zero position to effect stoppage of the driven shaft, means to automatically cause cessation of such adjustment when the driven shaft comes to rest, and means to insure a definite final driven shaft position, consisting of a guard for determining the time of effecting the stopping adjustment.

28. In a power driven machine the combination of a driving shaft, a driven shaft, a variable speed transmitter between said shafts, a constantly rotating device actuated from the driving shaft, connections from said device adapted to adjust the transmitter to zero position to effect stoppage of the driven shaft, means to automatically cause cessation of such adjustment when the driven shaft comes to rest, and means controlled from the driven shaft to insure a definite final driven shaft position.

29. In a power driven machine the combination of a driving shaft, a driven shaft, a variable speed transmitter between said shafts, a constantly rotating device actuated from the driving shaft, connections from said device adapted to adjust the transmitter to zero position to effect stoppage of the driven shaft, means to automatically cause cessation of such adjustment when the driven shaft comes to rest, means to insure a definite final driven shaft position, consisting of a guard for determining the time of effecting the stopping adjustment, and means for actuating said guard in time with the driven shaft.

30. In a power driven machine the combination of a driving shaft, a driven shaft, a variable speed transmitter between said shafts, a constantly rotating device actuated from the driving shaft adapted to adjust the transmitter, connections, including a clutching means, between said device and the transmitter, and means to automatically cause said clutching means to unclutch when the driven shaft comes to a given speed condition.

31. In a power driven machine the combination of a driving shaft, a driven shaft, a variable speed transmitter between said shafts, constantly rotating devices actuated from the driving shaft adapted to adjust the transmitter, connections, including a clutching means, between said devices and the transmitter, means to clutch said clutching means to initiate adjustment of the transmitter toward or from zero position, and means to automatically cause said clutching means to unclutch when the driven shaft comes to either zero or working speed.

In testimony whereof I affix my signature in presence of two witnesses.

AUGUST R. SCHOENKY.

Witnesses:
TERENCE D. GORDON,
J. WARREN NICHOLS.